May 20, 1952   W. SCHAELCHLIN ET AL   2,597,191
ADJUSTABLE CURRENT COMPENSATION ON DYNAMICELECTRIC MACHINE
Filed Sept. 25, 1948                                       2 SHEETS—SHEET 1

WITNESSES:

INVENTORS
Walter Schaelchlin and
Amos J. Winchester, Jr.
BY
ATTORNEY

Patented May 20, 1952

2,597,191

UNITED STATES PATENT OFFICE 2,597,191

ADJUSTABLE CURRENT COMPENSATION ON DYNAMIC-ELECTRIC MACHINE

Walter Schaelchlin, Buffalo, N. Y., and Amos J. Winchester, Jr., Pittsburgh, Pa., assignors to Westinghouse Electric Corporation, East Pittsburgh, Pa., a corporation of Pennsylvania Application September 25, 1948, Serial No. 51,262

6 Claims. (Cl. 318—143)

This invention relates to direct current motor speed controls and in particular to a method and apparatus for improving the load-speed characteristic of a direct-current motor that is operated through a wide range of speeds.

To secure satisfactory operation of a direct current motor that is operated at various loads and speeds it is necessary to provide compensating and commutating windings to prevent the component of the magnetic flux produced by the armature current from distorting the component of the magnetic field produced by the main field winding and thus producing unsatisfactory commutating conditions.

Optimum commutating conditions are obtained when there is an excess of compensation since the commutation then takes place when the voltage in the coil under commutation had just passed zero but has not yet started to increase rapidly as the armature coil approaches the next field pole. The excess of compensation however tends toward making the motor unstable because not only does the compensation result in a smaller net flux in the field poles but also the voltage generated by current reversal in the coil undergoing commutation and the voltages generated by the compensating flux produce armature currents the reactions of which still further decrease the field flux. Since these generated voltages are proportional to the speed of the motor the excess compensation produces a differential field effect the magnitude of which varies with the speed of the motor. Therefore, if the motor is compensated by a field, or is driven from an overcompounded generator so as to have a flat speed-load curve at low speeds it has a rising unstable speed-load curve at high speeds.

The principal object of this invention is to provide load current compensation that is varied as the speed of the motor is varied thus providing a slightly drooping speed-load characteristic at all speeds.

Another object of the invention is to provide a variable voltage generator and motor system in which the generator voltage is automatically adjusted to compensate for the load characteristic of the motor in amounts that produce a slightly drooping speed-load characteristic at all speeds.

Another object of the invention is to provide variable load current compensation for a variable voltage system by varying the ratio between the current flow in a field of the generator and the load current of the motor.

A still further object of the invention is to provide variable load current compensation for a variable voltage system by exciting one field coil of a generator controlling the motor current with current drawn from the armature circuit of the motor and inserting resistance in series with such field coil as the speed of the motor is increased.

More specific objects and advantages are apparent from the following description of a preferred embodiment of the invention.

The invention consists in regulating the magnitude of the load current compensation, of a variable voltage system including a direct current motor, according to the speed of the motor so that the load current compensation plus the differential field effect of the compensating and commutating fields is substantially constant for all speeds of the motor. In the preferred form of the invention the compensation is effected by supplying a field coil of a control generator with a current derived from a passive portion of the armature circuit of the motor and regulating the proportion between the current in the coil and the armature current by inserting resistance in series with such field coil as the speed of the motor is increased. The passive portion of the armature circuit—a portion containing no source of voltage—may be a resistance inserted in series with the armature of the motor or it may be one or more of the compensating or commutating coils of the motor or generator.

A variable voltage drive system embodying the invention is illustrated in the accompanying drawings, in which.

Figure 1:
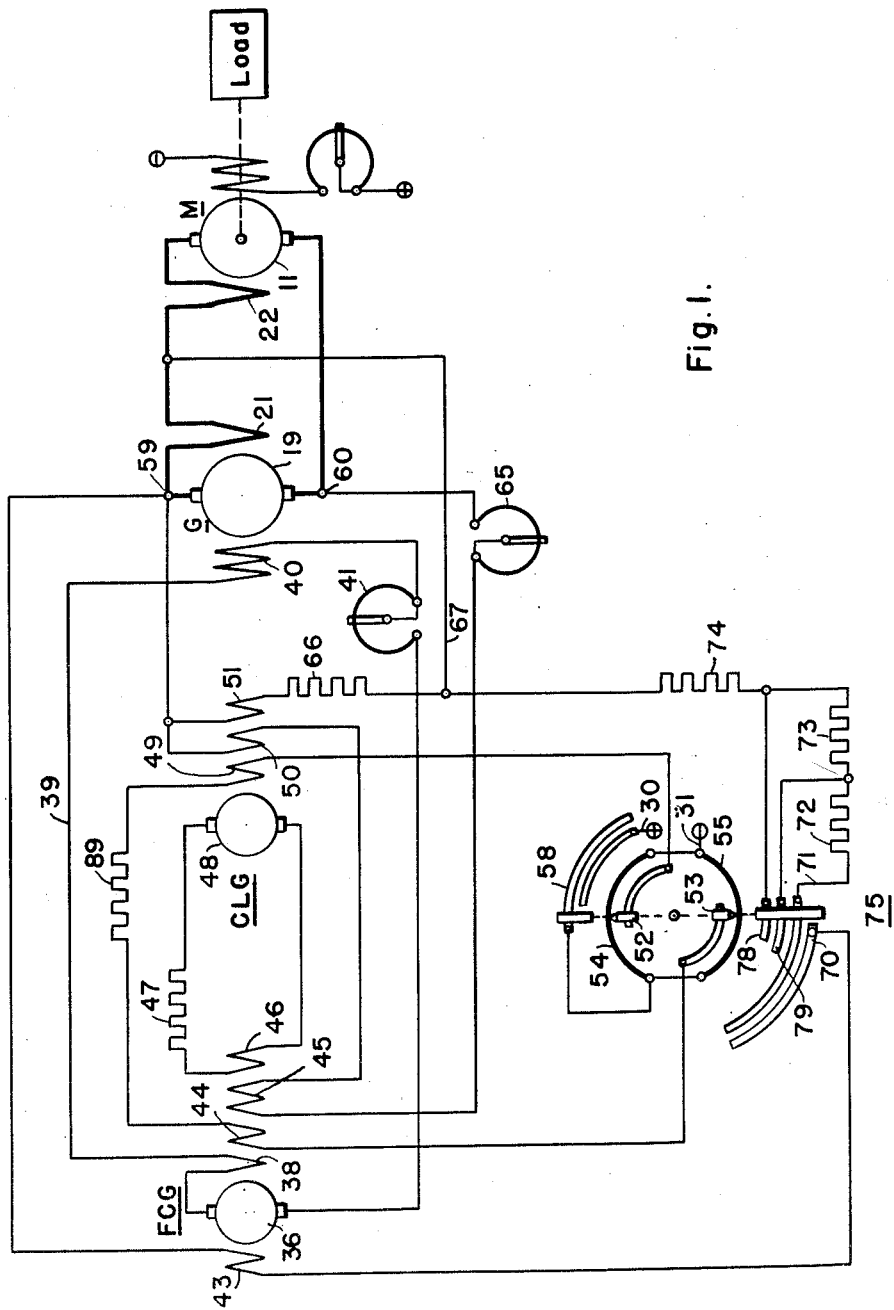
Figure 1 is a schematic diagram of a variable-voltage-speed drive requiring a variable speed drive having good speed regulation.

These specific figures and the accompanying description are intended merely to illustrate the invention and not to impose limitations on the claims.

A direct current variable voltage system employing adjustable load current compensation in combination with electromotive speed regulation according to the invention, comprises a direct current motor M having an armature 11 mechanically coupled to the load.

The armature 11 of the motor is connected electrically in a loop circuit that also includes the armature 19 of a direct current generator G. Compensating field and commutating coils 21 and 22 of the generator and motor respectively are included in the loop circuit. The generator is mechanically driven at a constant speed from a suitable prime mover.

The generator main field 40 is controlled in its excitation from the field control generator FCG. This generator and the current limit control generator CLG are mechanically coupled to a suitable motor, not shown, to be driven at a constant speed.

The output circuit of the field control generator FCG may be traced from one terminal of armature 36 through a series connected self energizing field coil 38, conductor 39, the field coil 40 of the generator G, a tuning resistor 41, to the other terminal of armature 36. The resistance of this circuit, by suitable selection of the resistance values of the elements of this circuit but mainly by adjustment of the tuning resistor 41, is made equal to the critical resistance of the generator FCG considering it as a series excited generator. Under this condition, because of the self energizing feature and critical resistance selected, a small increase in the field excitation causes the voltage of generator FCG to build up out of proportion to the change in excitation while a small decrease in field excitation causes a relatively large drop in voltage.

Generator FCG is provided with a plurality of field coils. The plurality of field coils include a load current compensating coil 43, a pattern voltage coil 44, a speed responsive control coil 45, and a current limit coil 46. The current limit coil 46 is fed through a resistor 47 from armature 48 of the current limit generator CLG. Generator CLG is also provided with a plurality of field coils including a pattern voltage coil 49, a control coil 50, and a current measuring field coil 51.

The pattern voltage coils 44 and 49 are connected in series between movable contact arms 52 and 53 of a pair of manually adjustable speed control potentiometers 54 and 55. The potentiometers 54 and 55 are connected, through contacts 58 in parallel between leads 30 and 31. The movable contact arms 52 and 53 are mechanically interconnected for operation from a single speed control shaft and are electrically arranged to vary the excitation of the pattern fields 44 and 49 from a positive maximum through zero to a negative maximum as the potentiometer contacts are moved through their range of travel.

This invention is fully disclosed if no reverse operation is considered.

The control coils 45 and 50 of the field control generator FCG and the current limit generator CLG, respectively, are connected in series between armature terminals 59 and 60 of generator 20. The circuit may be traced from the terminal 59 through control coils 50 and 45, and adjusting resistor 65 to the other armature terminal 60. The excitation for the control coils 45 and 50 is thus proportional to the armature voltage of generator 20.

The current measuring coil 51 through terminal 59 at one side and through a resistor 66 and lead 67 at the other side is connected in parallel with coil 21 and therefore carries a current proportional to the load current of the motor M.

The load current compensating coil 43 of the field control generator FCG is also connected in parallel with the compensating coil 21. This circuit leads from terminal 59 through the coil 43, contacts 70, a lead 71, and resistors 72, 73, and 74 to the lead 67. The current flowing in the load current compensating coil 43 is thus a fraction of the motor load current, the value of the fraction depending upon the resistance in this field circuit in relation to the voltage drop across coil 21. According to the invention this proportionality between the coil current and the load current is changed as the motor speed is changed.

The manual speed control, in addition to setting the movable contact arms 52 and 53 of the potentiometers 54 and 55, operates a master switch 75 having a plurality of contacts 78 and 79. Since contacts 58 and 70 are open in the zero position of the master switch the potentiometers 54 and 55 supplying the pattern field current coil 44 and the load current compensating coil 43 are deenergized as long as the speed control is in its zero speed position.

The contacts 78 and 79 are arranged to short out the resistors 72 and 73 in the circuit of the load current compensating coil 43 during selected portions of the speed range of the motor M. The contacts 78 are closed at zero speed and during a relatively small part of the speed range. The contacts 79 are also closed at zero speed and remain closed during a greater portion of the speed range, as for example one third of the speed range. Thus, by the insertion of resistance into the circuit of field 43 to vary the relation of field coil current to load current, the amount of load current compensation is decreased as the speed of the motor is increased.

Only half of the master switch 75 is shown in the drawings and this half suffices to illustrate this invention.

The resistors 47, 66, 74, and a resistor 89 in the circuits shown serve two purposes. First, they permit adjustment of tuning of the system to get the proper cooperation between the various components and, second, they reduce the time constants of the various fields and thus promote more rapid response in the control.

Figure 2:
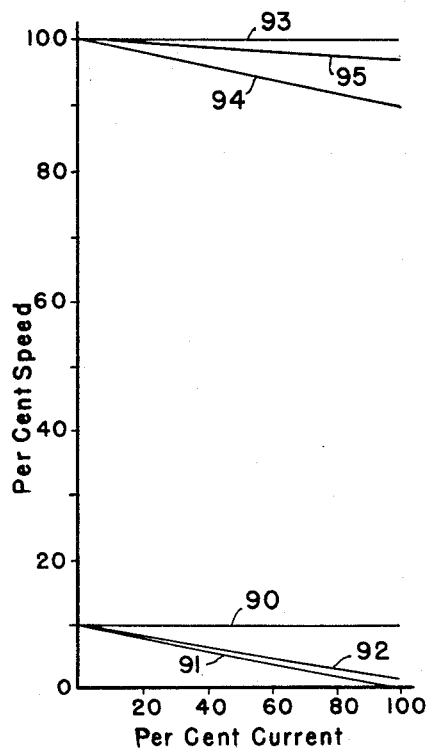
Figure 2 is a graph showing the variations in the speed regulation of a direct current motor when over-compensated and operated without the benefit of the improved control.

The speed-load or speed-current characteristic of an overcompensated motor is shown in Figure 2. In this figure a line 90 represents perfect speed regulation for operation at low speed. The vertical distance between the line 90 and another line 91 represents the drop in speed corresponding to the resistance loss in the armature—the IR voltage drop in the armature. The overcompensation in the commutating fields produces, at low speed, a slight differential field effect so that the speed loss is slightly less, as represented by a line 92, then would be expected from the IR drop considered alone. The combination of these effects is a speed drop with increase in load current according to the distance between the lines 90 and 92.

At high speeds the differential field effect of the compensating coils is much greater while the resistance loss is the same. Thus the distance between a line 93 representing perfect speed regulation at high speed and a line 94 representing the speed drop produced by the resistance loss is the same as the distance between the lines 90 and 91 representing these quantities at low speed. However the recovery of speed loss because of the overcompensation, represented by the distance from the line 94 to a line 95, is much greater than the corresponding recovery at low speed. This change, which is the speed-load characteristic with speed, seriously limits the load current compensation that may be used to correct the loss in speed produced by an increased load. If sufficient compensation is employed to give nearly perfect speed regulation at low speeds the motor is unstable at high speed, while if the compensation is correct at high speed it has a drooping speed-load characteristic at low speeds.

According to the invention this change in speed-load characteristic is compensated by including in the speed control an additional control that changes the effectiveness of the load current compensation at the same time that the speed is changed. By thus changing the load current compensation at the same time the speed is changed the sum of the differential field effect and the load current compensation may be kept constant throughout the entire speed range of the motor. The change in load current compensation with speed may be effected by decreasing the resistance of a shunt that by-passes the commutating and compensating field coil of the motor, or by decreasing the resistance of a shunt that by-passes the commutating field coil of the generator as its voltage and the speed of the motor is increased. The same effect may be obtained by inserting resistance in series with a load current compensating field coil of a control generator when such field coil is energized by the voltage drop across a passive portion of the armature circuit of the generator and motor. This last method is employed in the system shown in Figure 1 in which the resistors 72 and 73 are inserted in series with the load current compensating field coil 43 of the field control generator FCG as the speed of the motor is increased.

In each method of correction there is provided a magneto-motive force the magnitude of which is proportional to the load current of the motor and the ratio of said force to the motor load current is varied as the speed of the motor is varied. In the case of the differentially connected series field coil the magnetomotive force opposes the main field magnetomotive force, in the case of the cumulatively connected field coil the reverse is true. The result is the generator voltage increases with an increase in load current and at a rate that decreases with an increase in the speed of the motor. In the case of the field control generator the voltage effect produced by the load current compensating field coil 43, which is varied according to the speed setting, increases the field current of the main generator and thus provides a voltage that is varied according to the speed of the motor.

Again referring to Figure 1, the control system includes the current limit generator CLG which, taking its signal from the voltage drop across field 21 of the armature circuit of the motor M and generator G, overrides the speed control whenever the motor armature current tends to exceed a predetermined limit. The magnetic circuit and the field coils of this generator are arranged so that under steady state conditions and normal load current there is no net flux threading its armature and therefore no output. As the load current increases beyond the predetermined maximum a portion of the magnetic circuit (shunt around the armature) becomes saturated thus forcing field flux through the armature 48. The resulting generated voltage is applied to the field coil 46 of the control generator FCG and acting through the control generator FCG adjusts the field current of the generator G to reduce the load current.

Figure 3:
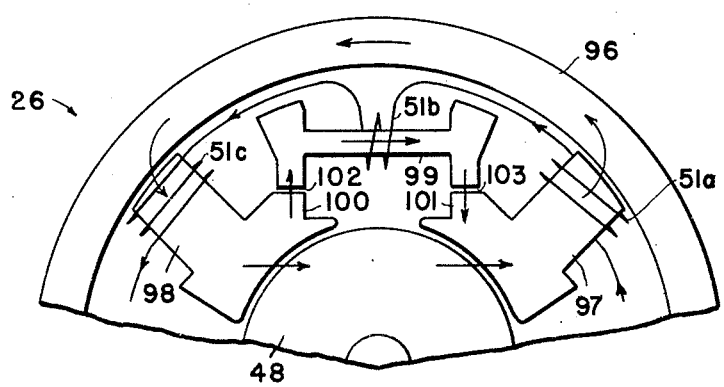
Figure 3 is a fragmentary end elevation of the current limit generator to show its magnetic circuit.

Referring now to Figure 3, the magnetic circuit of the current limit generator CLG comprises a yoke or field frame 96, field poles 97 and 98, the armature 48, and a saturable shunt 99 spanning the space between pole shoes 100 and 101 of the poles 97 and 98, respectively. The other half of the field structure is similarly constructed. The pattern field winding 49 and the control field winding 50 are wound on the poles 97 and 98 in a conventional manner and are not shown in the figure. These two windings normally cancel each other leaving no net magnetizing force.

The load current measuring field winding 51 of the current limit generator CLG is distributed between the poles 97 and 98 and the saturable shunt 99 with a coil 51a wound on the pole 97, a coil 51b wound on the shunt 99, and a coil 51c wound on the pole 98. The magnetic flux set up by current flowing in the winding 51 may be traced in the direction of the arrows from a point in the yoke 96, through the pole 98, the pole shoe 100, across an air gap 102 to the shunt 99, through the shunt 99, across a second air gap 103 and through the pole shoe 101 and pole 97 back to the yoke 96. In this arrangement the coils 51a and 51c supply the magnetomotive force to drive the flux through the yoke 96, the poles 97 and 98, and the pole shoes 100 and 101 as well as across air gaps separating the poles 97 and 98 from the yoke 96. The coil 51b, wound on the saturable shunt 99, supplies just enough magnetomotive force to drive the flux across the air gaps 102 and 103 and through the shunt 99 as long as the shunt is not saturated. The unsaturated shunt 99 thus carries all of the flux from the pole shoe 100 to the pole shoe 101 leaving none of it to thread the armature 48. As the current flowing through the winding 51 increases the shunt 99 saturates thus limiting the flux following this path and forcing the excess through the armature 48. In the system shown in Figure 1 this excess flux threading the armature 48 generates a voltage which, applied to the current limit field 46 of the field control generator FCG, adjusts the generator voltage to reduce the motor load current.

Figure 4:
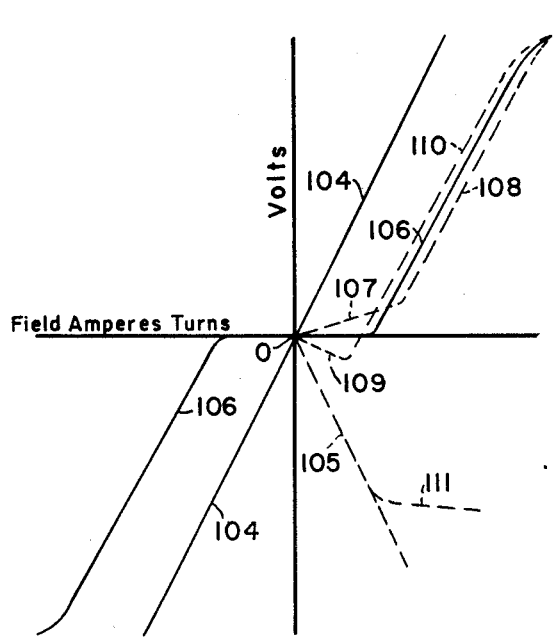
Figure 4 is a graph showing the generated voltage of the current limit generator as a function of the ampere turns in its various field coils.

The relationship between the voltage generated in the armature 48 of the current limit generator CLG and the ampere turns of the various fields is shown graphically in Figure 4. The voltage generated by current flow in the pattern field winding 49 varies directly with the current as is shown by a line 104. The proportionality between the field current and the armature voltage is accurately maintained by employing relatively large air gaps in the magnetic circuit. The voltage generated by current flow in the control winding 50 is also linear with respect to current and is normally of opposite polarity to that generated by the pattern field 49. This is indicated by the dotted straight line 105.

The voltage generated by current flow in the current measuring field 51 is shown by the line 106. For small or normal load currents the shunt 99 prevents the generation of any voltage and the line 106 follows the zero voltage axis. As the shunt saturates with an increase in current the voltage rises and when fully saturated the voltage per increment of field ampere turns is practically the same as for the pattern field and the control field. Thus the sloping portions of the line 106 are parallel to the line 104 representing the generated voltage versus pattern field ampere turns.

It is difficult in practice to obtain an exact balance between the ampere turns of the coil 51b and the reluctance of the air gaps 102 and 103 and occasionally it is desirable to modify the characteristic of the current measuring field 51 by deliberately upsetting this balance. If the balance between the coil 51b and the air gaps is upset by increasing the length of the air gaps the shunt does not take all of the flux and a fraction of it threads the armature 48. Therefore the voltage starts to rise at a low rate from zero field current as is illustrated by a dotted line 107. When the shunt finally saturates, which occurs at a higher value of field ampere turns because of the increased reluctance of the air gaps, the voltage rises rapidly along a line 108 parallel to the line 106. If the balance is upset in the opposite direction, as by decreasing the length of the air gaps, the coil 51b provides an excess of magnetomotive force and the resulting flux divides, some passing through the field poles and yoke and some passing back through the armature 48. The flux passing back through the armature causes the generated voltage to first go negative along a line 109 until the shunt 99 saturates, which occurs at a lower value of ampere turns because of the decreased reluctance of the air gaps, and then rise rapidly in a positive direction as indicated by a line 110.

The combination of a first field winding similar to the current measuring field coil 51 and a second field coil similar to the control field coil 50 may be used to obtain still another characteristic. Thus if the two fields are connected to oppose each other and excited from a common source the generated voltage increases proportionally to the ampere turns of the control field until the shunt saturates and then the first winding cancels the second to hold the generated voltage substantially constant at a value corresponding to the saturation point of the shunt. Such a characteristic is illustrated in Figure 4 by the line 105 and an extension 111 showing the break or change in slope as the shunt 99 saturates.

The cooperation between the various fields of the field control generator FCG and the current limit generator CLG may be easily understood by tracing the operation and effect of each as the motor 10 is started from rest, accelerated to a selected speed, and overloaded without a change in speed selection, assuming that the generators are all running and the speed selector set at zero motor speed.

Next the speed control may be moved to some speed selection. (A rapid movement is assumed.) The first increment of movement closes the contacts 58, 70, 78 and 79. The contacts 58 thereupon connect the speed control potentiometers 54 and 55 into the circuit and contacts 70 complete the circuit through the load current compensating field coil 43. The pattern field windings, energized from the potentiometers, now produce magnetomotive forces proportional to the speed setting. The resulting generated voltage in the field control generator FCG causes current to flow in its armature circuit and the field winding 40 of the generator G. This armature current flowing through the series field coil 38 supplies the field loss of the generator CLG so that, without any counteracting magnetomotive force the pattern field winding 44 plus the self-energizing winding 39 drive the control generator FCG to its maximum voltage as determined by saturation of its magnetic circuit.

Until the motor M approaches the selected speed the counteracting magnetomotive force comes from two sources. First, the effect produced by the current flowing through the pattern field winding 49 of the current limit generator CLG causes current flow through the current limit field coil 46 of the control generator FCG. The magnetomotive force of this current limit coil 46 is opposite that of the pattern field winding 44 but not sufficient to overcome it nor to prevent the control generator voltage from reaching its maximum or ceiling voltage. The second source of counteracting magnetomotive force results from the load current limiting action of the generator CLG. Thus, as soon as field current started to flow in the field 40 load current circulates through the motor armature 11 and the generator armature 19. Since the motor is not running at the selected speed there is insufficient countervoltage to limit the motor armature current and it tends to exceed the preset limits. The current measuring field winding 51 is thus energized beyond the saturation point of the shunt 99 so that it aids the pattern voltage winding 49 and the resulting current flowing in the current limit winding 46 is sufficient to overcome the pattern winding 44. The output of the field control generator FCG is therefore held at a value just sufficient to cause the generator G to maintain the preset load current in the motor M.

As motor M accelerates and its countervoltage increases the output voltage of generator G must also increase to maintain the desired motor current. In this system the voltage of generator G is used as a measure of the speed of the motor M. This is effected by the control field windings 45 and 50 which are connected across the armature 19 of generator G. These windings are connected so that they oppose the pattern field windings 44 and 49. In the current limit generator CLG the control field winding 50 serves to reduce the output voltage and thus the current flowing in the current limit coil 46 of the field control generator FCG. In the generator FCG the control coil 45 and current limit coil 46 are additive so that the loss in ampere turns in the current limit coil 46 is more than made up by the increase in ampere turns in the coil 45. It must be noted that for stable operation the magnetomotive force of the pattern or control coils 44 or 45 must be greater than the magnetomotive force of the current limit coil 46 resulting from current flowing in the pattern or control coils 49 or 50 of the current limit generator CLG. Thus, since the control coil 45 more than compensates for the decrease in current in the current limit coil 46 and since the control coil 45 tends to decrease the output of the control generator—the field current of the generator G—it follows that equilibrium in the current limiting action through the coil 51 occurs at slightly lower load currents as the generated voltage increases.

As the motor M approaches the selected speed the control coils 45 and 50 provide the counteracting magnetomotive force to limit the effect of the pattern field and thus limit the generated voltage. At this time the motor current decreases below the saturation point of the shunt 99, the coil 51 no longer exerts any control action, and the current in the field 40 of generator G is controlled by the balance between the pattern and control fields thus maintaining constant generator voltage and tending to maintain constant motor speed.

It is during this operation at the selected speed that the adjustable load current compensation is employed. Some compensation is employed at all speeds and the amount is selected according to the speed. In the illustrated system the compensation is effected by the coil 43 of the field current control generator FCG which coil, in series with control resistors 72, 73, and 74, is connected in parallel with coil 21 of the motor armature circuit. The coil 43 is connected to aid the pattern field coil 44 and serves to recalibrate the pattern field in amounts determined by the speed and load and thus adjust the generator voltage to compensate for the resistance drop in the motor armature circuit less the differential effect of the overcompensation in the commutating windings.

If, without changing the speed control setting, the load on the motor is increased, the motor load current increases until finally the current measuring field 51 again becomes effective (upon saturation of the shunt 99) and acting through the current limit coil 46 recalibrates the pattern field in a downward direction to reduce the field current and generated voltage of generator G and thus allows the motor M to slow down or stall at constant torque.

It will be noted that for the slowest speed setting contacts 78 and 79 are closed. This provides shunts for both the resistors 72 and 73. As the speed setting is increased, the contact 79 is first opened. This operation inserts resistor 73 in the circuit of field 43. As a still higher speed is selected the contacts 78 are opened and then both resistors 72 and 73 are inserted in the circuit for field 43.

During acceleration or overloading of the motor M the current measuring field coil 51 acts additively to the pattern field coil 49 to effect a decrease in the current applied to generator field 40 and thus the voltage supplied to the motor armature 11. The reverse occurs if, while operating at some speed in one direction, the speed control is rapidly changed to call for operation at a slower speed or in reverse. Thus, when the speed control potentiometers are readjusted to a slower speed or reverse, the control field 45 predominates over the pattern field 44 to drive the output voltage of the field control generator FCG downwardly and thus decrease the field current in the field coil 40 of generator G. The generated voltage accordingly decreases and when it drops below the countervoltage of the motor the load current reverses and increases in the opposite direction until it reaches the selected maximum value. At this point the shunt 99 saturates and the coil 51 now aids the control coil 50. (The generator current has reversed but its voltage has not yet gone through zero.) The resulting current flow from the current limit generator CLG to the current limit coil 46 sets up a field opposing the field of the control coil 45, thus tending to increase the output of the control generator FCG and the voltage of generator G. This action of the current measuring field coil 51 and the control field coils 45 and 50 serves to maintain the decelerating load current at the maximum allowable limit until the new speed condition is fulfilled.

The motor control system illustrated in the drawings serves to drive a direct current motor throughout its complete range of speed and load while protecting it from overload. It provides the maximum of load current compensation that can be used at any speed and by adjusting the compensation according to the speed of the motor maintains the optimum amount of compensation at all speeds.

Various modifications in the arrangement of the circuit may be made without departing from the spirit and scope of the invention.

We claim as our invention:

1. In a motor speed control of the class described, in combination, a motor, differentially compensating field windings and commutating field windings for the motor, said field windings producing a differential compounding effect that normally increases as the speed of the motor increases, a variable voltage generator connected to drive said motor, means for varying the excitation of the variable voltage generator, means for providing for the variable voltage generator a component of field excitation that varies as the current delivered to the motor varies, and means, ganged in operation with the means for varying the voltage of the variable voltage generator, for decreasing the relative magnitude of the said component of field excitation per motor current variations as the speed of the motor is increased to thus decrease the normal increase in differential compounding with an increase in motor speed.

2. In a motor speed control of the class described, in combination, a motor, a commutating field for the motor, said commutating field producing a differential compounding effect that normally increases as the speed of the motor increases, a variable voltage main generator for driving the motor, a field winding for the main generator, a field control generator for supplying excitation current to the field winding of the main generator, a control field coil for said control generator that is connected in parallel with a passive portion of the armature circuit of the main generator and motor, a pattern field for the control generator, rheostatic means for increasing the excitation of the pattern field to thus increase the motor speed, and means, ganged with said rheostatic means, for decreasing the current flow in said control field coil per unit of motor load current as the speed of the motor is increased to thus eliminate the normal increase in differential compounding with an increase in motor speed.

3. In a motor speed control of the class described, in combination, a motor, a commutating field winding in the motor, said commutating field winding producing a differential compounding effect that normally increases as the speed of the motor increases, a variable voltage main generator for driving the motor, a field winding for the generator, a series field coil connected in the armature, or load, circuit of the motor and generator, a control generator for supplying excitation current to the main generator field winding, a pattern field winding for the control generator, rheostatic means for increasing the excitation of the pattern field winding, a control field coil for said control generator that is connected in parallel with said series field coil included in the armature circuit of the main generator and motor, resistors adapted to be connected in series with the control field winding, and means gauged with said rheostatic means operable to insert said resistors in series with said control field coil as the speed of the motor is increased to thus eliminate the normal increase in differential compounding with an increase in motor speed.

4. In a motor speed control of the class described, in combination, a motor, a commutating field winding in the motor, said commutating field producing a differential compounding effect that normally increases as the speed of the motor increases, a variable voltage main generator for driving the motor, a field winding for the main generator, a field control generator for supplying excitation current to the field winding of the main generator, voltage control means for increasing the voltage of the control generator, a control field coil for said control generator that is connected in parallel with a passive portion of the armature circuit of the generator and motor, and a resistor, mechanically coupled to said voltage control means, to be inserted in series with said control field coil when the speed of the motor is increased beyond a predetermined value to thus eliminate the normal increase in differential compounding with an increase in motor speed.

5. In a motor speed control system of the class described, in combination, a motor, a commutating field winding in the motor, said commutating field winding producing a differential compounding effect that normally increases as the speed of the motor increases, a variable voltage main generator for driving the motor, a field winding for the main generator, a field control generator for supplying excitation current to the field winding of the main generator, a rheostat for the control generator operable to increase the field current in the field winding of the main generator, a control field coil in said control generator that is connected in parallel with a passive portion of the armature circuit of the main generator and motor, and a plurality of resistors operatively gauged with said rheostat so that said resistors are successively inserted in series with said control field coil as the speed of the motor is increased to thus eliminate the normal increase in differential compounding with an increase in motor speed.

6. In an electric system of control for controlling the speed of a direct current motor, in combination, a direct current motor, a separately excited field winding for the motor, said separately excited field winding being normally excited at a constant value, a series commutating field winding for the motor, a variable voltage main generator, a field winding for the main generator, said main generator and motor being connected in a loop circuit whereby the motor is operated from said main generator, a series differentially compensating winding for the main generator, said compensating and commutating windings producing a differential compounding effect that normally increases as the speed of the motor increases, a control generator connected to provide the field winding of the main generator with excitation current, rheostatic means for increasing the voltage of the control generator to thus increase the voltage of the main generator, a control field coil in said control generator that is connected in parallel with the portion of said loop circuit including the series differentially compensating winding, and a plurality of resistors gauged with said rheostatic means to be successively inserted in series with said control field coil as the voltage of the main generator is increased to thus control the normal increase in differential compounding with an increase in motor speed.

WALTER SCHAELCHLIN.
AMOS J. WINCHESTER, Jr.

REFERENCES CITED

The following references are of record in the file of this patent:

UNITED STATES PATENTS

| Number | Name | Date |
|---|---|---|
| 1,699,024 | Schnitzer | Jan. 15, 1929 |
| 2,411,371 | Harding | Nov. 19, 1946 |
| 2,412,888 | Ivy | Dec. 17, 1946 |